US012806885B2

(12) United States Patent
Van De Vyver et al.

(10) Patent No.: US 12,806,885 B2
(45) Date of Patent: Nov. 24, 2026

(54) POLYMER INTERLAYERS WITH REDUCED EDGE BUBBLES

(71) Applicant: SOLUTIA INC., St. Louis, MO (US)

(72) Inventors: Stijn Simonne Paul Van De Vyver, Ghent (BE); Hans Herman Martha Creytens, Eeklo (BE)

(73) Assignee: Solutia Inc., St. Louis, RI (US)

( * ) Notice: Subject to any disclaimer, the term of this patent is extended or adjusted under 35 U.S.C. 154(b) by 120 days.

(21) Appl. No.: 18/702,518

(22) PCT Filed: Nov. 17, 2022

(86) PCT No.: PCT/US2022/050188
§ 371 (c)(1),
(2) Date: Apr. 18, 2024

(87) PCT Pub. No.: WO2023/091537
PCT Pub. Date: May 25, 2023

(65) Prior Publication Data

US 2024/0408852 A1 Dec. 12, 2024

Related U.S. Application Data

(60) Provisional application No. 63/264,399, filed on Nov. 22, 2021.

(51) Int. Cl.
*B32B 17/10* (2006.01)

(52) U.S. Cl.
CPC .. *B32B 17/10036* (2013.01); *B32B 17/10568* (2013.01); *B32B 17/10935* (2013.01);
(Continued)

(58) Field of Classification Search
CPC ........ B32B 17/10036; B32B 17/10568; B32B 17/10688; B32B 17/10761; B32B 17/10935; B32B 2250/03; B32B 2307/102; B32B 2307/7376; B32B 2329/06; B32B 7/022; B32B 17/1088; B32B 2250/05; B32B 37/153; B05B 12/122;
(Continued)

(56) References Cited

U.S. PATENT DOCUMENTS 2,282,026 A 5/1942 Bren et al.
2,282,057 A 5/1942 Hopkins et al.
(Continued)

FOREIGN PATENT DOCUMENTS

EP 3 438 067 A1 2/2019
JP 2008-222513 A 9/2008
(Continued)

OTHER PUBLICATIONS

Co-pending U.S. Appl. No. 18/687,018, filed Feb. 27, 2024; Wenjie Chen.
(Continued)

*Primary Examiner* — Lawrence D Ferguson
(74) *Attorney, Agent, or Firm* — Steven A. Owen

(57) ABSTRACT

A polymer interlayer that resists formation of optical defects. The polymer interlayer comprises a first polymer layer, a second polymer layer, and a third polymer layer. The first polymer layer is positioned between the second polymer layer and the third polymer layer. The first polymer layer comprises a resin including an adhesion control agent in the range of about 0.1 to 15 titers.

13 Claims, 4 Drawing Sheets

(52) U.S. Cl.
CPC ... *B32B 2250/03* (2013.01); *B32B 2307/7376* (2023.05); *B32B 2329/06* (2013.01)

(58) Field of Classification Search
CPC . B05B 13/005; E01H 11/00; G06F 18/21347; G06T 1/20; G06T 2207/20021; G06T 7/0002; G06V 20/188; G06V 20/56; H04N 23/54
See application file for complete search history.

(56) References Cited

U.S. PATENT DOCUMENTS

| | | | |
|---|---|---|---|
| 5,137,954 | A | 8/1992 | DasGupta et al. |
| 5,728,472 | A | 3/1998 | D'Errico |
| 2013/0074931 | A1 | 3/2013 | Chen et al. |
| 2015/0321453 | A1 | 11/2015 | Lellig et al. |
| 2017/0174868 | A1 | 6/2017 | Thompson et al. |
| 2019/0366691 | A1 | 12/2019 | Iwamoto et al. |
| 2021/0078299 | A1 | 3/2021 | Keller |
| 2021/0197532 | A1 | 7/2021 | Manz et al. |
| 2025/0001737 | A1 | 1/2025 | Chen |

FOREIGN PATENT DOCUMENTS

| | | | |
|---|---|---|---|
| WO | WO 2004/011538 | A2 | 2/2004 |
| WO | WO 2005/090459 | A1 | 9/2005 |
| WO | WO 2016/053701 | A1 | 4/2016 |
| WO | WO 2016/094227 | A1 | 6/2016 |
| WO | WO 2017/151345 | A1 | 9/2017 |
| WO | WO 2018/075288 | A1 | 4/2018 |
| WO | WO 2020/173838 | A1 | 9/2020 |
| WO | WO 2022/187082 | A1 | 9/2022 |

OTHER PUBLICATIONS

Notification of Transmittal of the International Search Report and the Written Opinion of the International Searching Authority, or the Declaration received in International Application No. PCT/US2022/041464 date of mailing Nov. 21, 2022.

Notification of Transmittal of the International Search Report and the Written Opinion of the International Searching Authority, or the Declaration received in International Application No. PCT/US2023/062100 date of mailing Jul. 27, 2023.

Notification of Transmittal of the International Search Report and the Written Opinion of the International Searching Authority, or the Declaration received in International Application No. PCT/US2022/050188 date of mailing Mar. 2, 2023.

Wade, Bruce; "Vinyl Acetal Polymers"; Encyclopedia of Polymer Science and Technology; 2016; pp. 1-22.

Co-pending U.S. Appl. No. 18/836,168, filed Aug. 6, 2024; Wenjie Chen.

USPTO Office Action dated Mar. 23, 2026 received in co-pending U.S. Appl. No. 18/687,018.

POLYMER INTERLAYERS WITH REDUCED EDGE BUBBLES

CROSS-REFERENCE TO RELATED APPLICATION(S)

This application is a national stage filing under 35 USC § 371 of International Application Number PCT/US2022/050188, filed on, Nov. 17, 2022 which claims the benefit of the filing date to U.S. Provisional Application No. 63/264,399, filed on Nov. 22, 2021, the entire disclosures of which are incorporated by reference herein.

FIELD OF THE INVENTION

The present invention is related to the field of polymer interlayers and multiple layer panels comprising polymer interlayers. More specifically, the present invention is related to the field of polymer interlayers comprising multiple polymer layers.

DESCRIPTION OF RELATED ART

Multiple layer panels are panels comprised of two sheets of a substrate (such as, but not limited to, glass, polyester, polyacrylate, or polycarbonate) with one or more polymer interlayers sandwiched therebetween. Laminated multiple layer glass panels are commonly utilized in architectural window applications and in the windows of motor vehicles and airplanes, and in photovoltaic solar panels. The first two applications are commonly referred to as laminated safety glass. The main function of the interlayer in the laminated safety glass is to absorb energy resulting from impact or force applied to the glass, to keep the layers of glass bonded even when the force is applied and the glass is broken, and to prevent the glass from breaking up into sharp pieces. Additionally, the interlayer may also give the glass a preferential sound insulation rating, reduce UV and/or IR light transmission, and enhance the aesthetic appeal of the associated window. For example, laminated glass panels with desirable acoustic properties have been produced, resulting in quieter internal spaces.

Furthermore, laminated glass panels been used in vehicles equipped with heads-up display ("HUD") systems (also referred to as head-up systems), which project an image of an instrument cluster or other important information to a location on the windshield at the eye level of the vehicle operator. Such a display allows the driver to stay focused on the upcoming path of travel while visually accessing dashboard information. Generally, the HUD system in an automobile or an aircraft uses the inner surface of the vehicle windscreen to partially reflect the projected image. However, there is a secondary reflection taking place at the outside surface of the vehicle windscreen that forms a weak secondary image or "ghost" image. Since these two reflective images are offset in position, double images are often observed, which cause an undesirable viewing experience to the driver. When the image is projected onto a windshield which has a uniform and consistent thickness, the interfering double, or reflected ghost, image is created due to the differences in the position of the projected image as it is reflected off the inside and outside surfaces of the glass.

One method of addressing these double or ghost images is to orient the inner and outer glass sheets at an angle from one another. This aligns the position of the reflected images to a single point, thereby creating a single image. Typically, this is done by displacing the outer sheet relative to the inner sheet by employing a wedge-shaped, or "tapered," interlayer that includes at least one region of nonuniform thickness. Many conventional tapered interlayers include a constant wedge angle over the entire HUD region, although some interlayers have recently been developed that include multiple wedge angles over the HUD region.

In order to achieve the required property and performance characteristics for glass panels, it has become common practice to utilize multiple layer or multilayered interlayers. As used herein, the terms "multilayer" and "multiple layers" mean an interlayer having more than one layer, and multilayer and multiple layer may be used interchangeably. Multiple layer interlayers typically contain at least one soft layer and at least one stiff layer. As noted above, interlayers with one soft "core" layer sandwiched between two more rigid or stiff "skin" layers have been designed with sound insulation properties for the glass panel. Interlayers having the reverse configuration, that is, with one stiff layer sandwiched between two more soft layers have been found to improve the impact performance of the glass panel and can also be designed for sound insulation. Regardless, the soft "core" layer is generally referred to as an acoustic layer (as the soft layer beneficially reduces sound transmission), while the hard "skin" layer is referred to as a conventional layer, or non-acoustic layer.

The layers of the interlayer are generally produced by mixing a polymer resin such as poly(vinyl butyral) with one or more plasticizers and melt processing the mix into a sheet by any applicable process or method known to one of skill in the art, including, but not limited to, extrusion, with the layers being combined by processes such as coextrusion and lamination. In a trilayer interlayer, the core layer may include more plasticizer than the skin layers, such that the core layer is softer than relatively harder skin layers. Other additional ingredients, as described in more detail below, may optionally be added for various other purposes. After the interlayer sheet is formed, it is typically collected and rolled for transportation and storage and for later use in the multiple layer glass panel, as discussed below.

The following offers a simplified description of the manner in which multiple layer glass panels are generally produced in combination with the interlayers. First, a multiple layer interlayer may be co-extruded using a multiple manifold co-extrusion device. The device operates by simultaneously extruding polymer melts from each manifold toward an extrusion opening. Properties of the layers can be varied by adjusting attributes (e.g., temperature and/or opening dimensions) of the die lips at the extrusion opening. Once formed, the interlayer sheet can be placed between two glass substrates and any excess interlayer is trimmed from the edges, creating an assembly. It is not uncommon for multiple polymer interlayer sheets or a polymer interlayer sheet with multiple layers (or a combination of both) to be placed within the two glass substrates creating a multiple layer glass panel with multiple polymer interlayers. Then, air is removed from the assembly by an applicable process or method known to one of skill in the art; e.g., through nip rollers, vacuum bag or another deairing mechanism. Additionally, the interlayer is partially press-bonded to the substrates by any method known to one of ordinary skill in the art. In a last step, in order to form a final unitary structure, this preliminary bonding is rendered more permanent by a high temperature and pressure lamination process, or any other method known to one of ordinary skill in the art such as, but not limited to, autoclaving.

Multilayer interlayers such as a trilayer interlayer having a soft core layer and two stiffer skin layers are known to provide beneficial acoustic damping properties. However, such interlayers, as well as glass panels containing these interlayers, can develop optical defects commonly known as "bubbles." Specifically, during the manufacturing process of interlayers and/or laminated multiple layer glass panel constructs, bubbles commonly appear in the soft core of the interlayer. Often, such bubbles are in the form of trim or edge bubbles, which appear near the edges of the interlayers and/or the laminated panels. Specifically, edge bubbles are bubbles that form within a laminated glass panel, and particularly, within about 5 mm from edges of the glass sheets of the glass panel. Trim bubbles are bubbles that form in excess trim portions of the interlayers that extend beyond the edges of the glass sheets of the glass panel. Most of these bubbles become visible when the autoclave pressure is released. It is commonly understood that bubble counts and bubble sizes can depend upon the moisture level in the autoclave. For instance, bubble nucleation may occur inside the core layer after the pressure of the polymer drops below the solubility pressure. Other variables that are known to contribute to the bubble problem include environmental contaminates and the rheology characteristics of the interlayers.

In view of the above, there is a need in the art for the development of a multilayered interlayer that resists the formation of these optical defects (i.e., bubbles) without a reduction in other optical, mechanical, and acoustic characteristics of a conventional multilayered interlayer. More specifically, there is a need in the art for the development of multilayered interlayers having at least one soft core layer and one stiff skin layer that resists the generation of bubbles (e.g., trim or edge bubbles).

SUMMARY

One aspect of the present invention concerns a polymer interlayer that resists formation of optical defects. The polymer interlayer comprises a first polymer layer, a second polymer layer, and a third polymer layer. The first polymer layer is positioned between the second polymer layer and the third polymer layer. The first polymer layer comprises a resin including an adhesion control agent in the range of about 0.1 to 15 titers.

Another aspect of the present invention concerns a polymer interlayer that resists formation of optical defects. The polymer interlayer comprises a core layer, a first skin layer, and a second skin layer. The core layer is positioned between the first and second skin layers. The core layer comprises a resin including an adhesion control agent in the range of about 0.1 to 15 titers.

A further aspect of the present invention concerns a method of forming a polymer interlayer that resists formation of optical defects. The method comprises the steps of extruding a first polymer melt to form a first polymer layer and extruding a second polymer melt to form a second polymer layer and a third polymer layer. Upon the extruding steps, the first polymer layer is positioned between the second and third polymer layers. The first polymer layer comprises a resin including an adhesion control agent in the range of about 0.1 to 15 titers.

DETAILED DESCRIPTION

Figure 1:
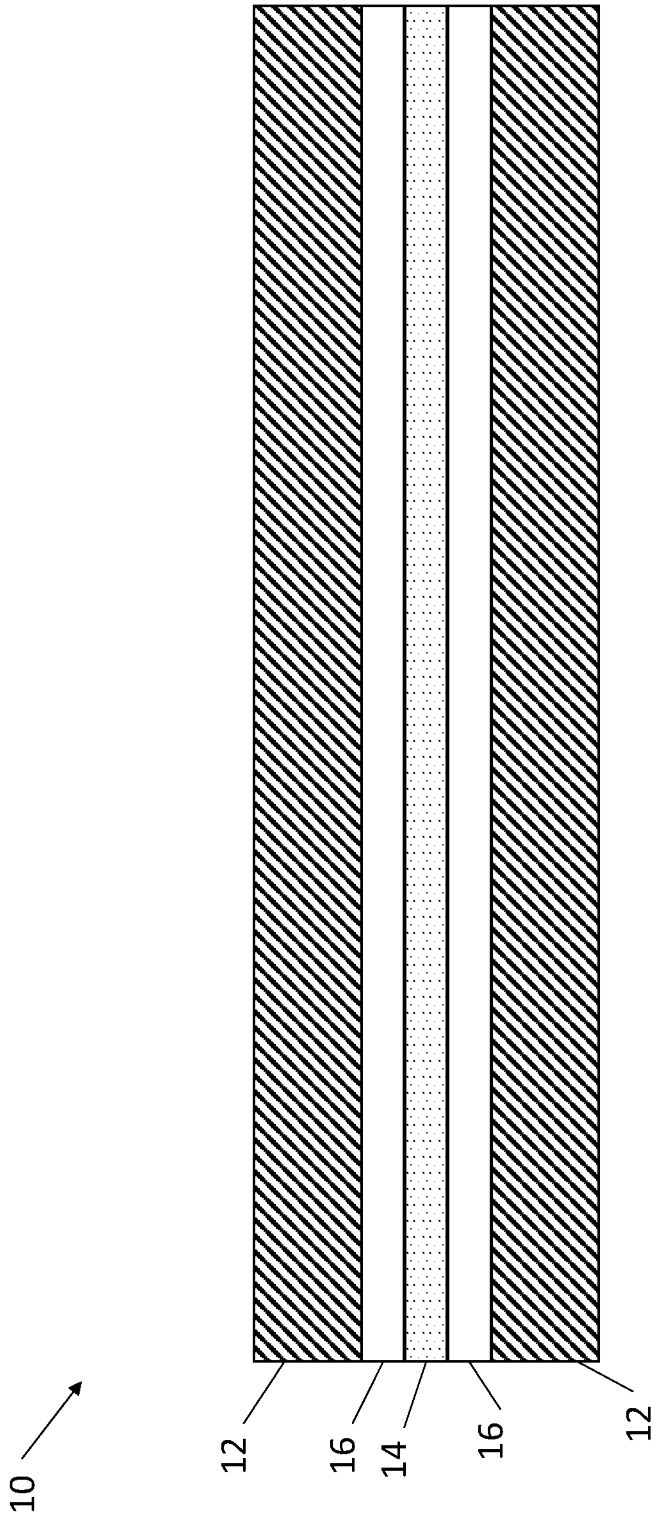
FIG. 1 is a schematic illustration of a laminated glass panel comprising a pair of glass plates opposing a polymer interlayer, with the polymer interlayer comprising a trilayer with a pair of skin layers opposing a core layer.

Embodiments of the present invention are directed to multiple layer panels and methods of making multiple layer panels. Generally, multiple layer panels are comprised of two sheets of glass, or other applicable substrates, with a polymer interlayer sheet or sheets sandwiched there-between. Multiple layer panels are generally produced by placing at least one polymer interlayer sheet between two substrates to create an assembly. FIG. 1 illustrates a multiple layer panel 10 comprising a pair of glass sheets 12 with a multilayered interlayer sandwiched therebetween. The multilayered interlayer is configured as a trilayer interlayer having three individual polymer interlayer sheets, including a soft core layer 14 and two relatively stiffer skin layers 16 positioned on either side of the core layer 14.

Figure 2:
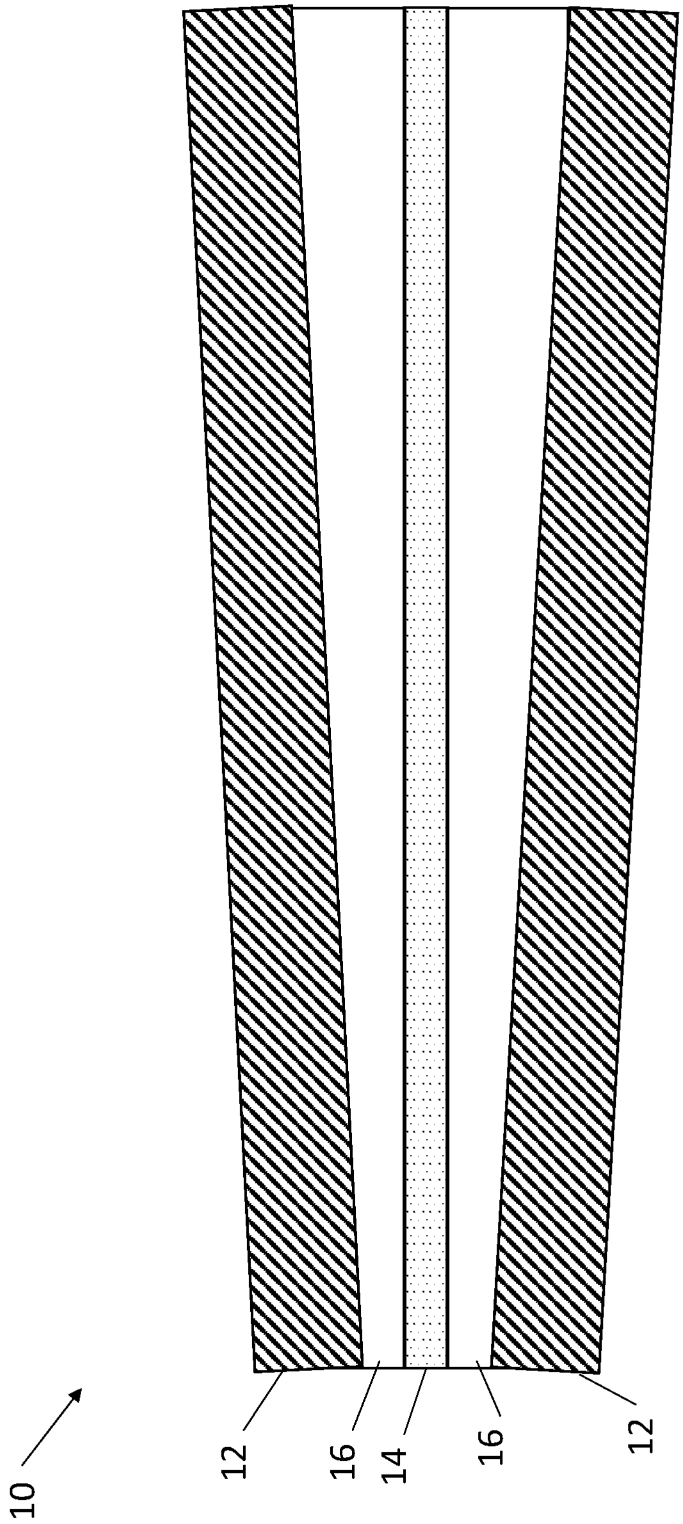
FIG. 2 is another schematic illustration of a laminated glass panel comprising a pair of glass plates opposing a polymer interlayer, with the polymer interlayer having a wedge shape.

In some embodiments, the interlayer (e.g., the core layer 14 and the skin layers 16) will have a generally constant or uniform thickness about the length of the interlayer. However, in alternative embodiments, as shown in FIG. 2, the interlayer may have at least one region of non-uniform thickness. For example, the interlayer, comprised of the core layer 14 and skin layers 16, may be wedge-shaped, such that the thickness of the interlayer changes (e.g., linearly or non-linearly) about the length of the interlayer. In some such embodiments, the thickness of the interlayer may change due to a thickness change in the core layer 14 (i.e., with the skin layers 16 having a generally constant thickness). Alternatively, the thickness of the interlayer may change due to a thickness change in the skin layers 16 (i.e., with the core layer 14 having a generally constant thickness). In further alternatives, the thickness of the interlayer may change due to a thickness change in both the core layer 14 and the skin layers 16.

In order to facilitate a more comprehensive understanding of the interlayers and multiple layer panels disclosed herein, the meaning of certain terms, as used in this application, will be defined. These definitions should not be taken to limit these terms as they are understood by one of ordinary skill, but simply to provide for improved understanding of how certain terms are used herein.

The terms "polymer interlayer sheet," "interlayer," "polymer layer", and "polymer melt sheet" as used herein, may designate a single-layer sheet or a multilayered interlayer. A "single-layer sheet," as the names implies, is a single polymer layer extruded as one layer. A multilayered interlayer, on the other hand, may comprise multiple layers, including separately extruded layers, co-extruded layers, or any combination of separately and co-extruded layers. Thus, the multilayered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; and a combination of at least one plural-layer sheet and at least one co-extruded sheet. In various embodiments of the present invention, a multilayered interlayer comprises at least two polymer layers (e.g., a single layer or multiple layers co-extruded) disposed in direct contact with each other, wherein each layer comprises a polymer resin. The term "resin," as utilized herein refers to the polymeric component (e.g., PVB) removed from the processes, such as those discussed more fully below. Generally, plasticizer, such as those discussed more fully below, is added to the resins to result in a plasticized polymer. Additionally, as described below, resins may have other components in addition to the polymer and plasticizer including; e.g., acetates, salts and alcohols.

It should also be noted that while poly(vinyl butyral) ("PVB") interlayers are often specifically discussed as the polymer resin of the polymer interlayers in this application, it should be understood that other thermoplastic interlayers besides PVB interlayers may be used. Contemplated polymers include, but are not limited to, polyurethane, polyvinyl chloride, poly(ethylene vinyl acetate) and combinations thereof. These polymers can be utilized alone, or in combination with other polymers. Accordingly, it should be understood that when ranges, values and/or methods are given for a PVB interlayer in this application (e.g., plasticizer component percentages, thickness and characteristic-enhancing additives), those ranges, values and/or methods also apply, where applicable, to the other polymers and polymer blends disclosed herein or could be modified, as would be known to one of ordinary skill, to be applied to different materials.

As used herein, the term "molecular weight" refers to weight average molecular weight (Mw). The molecular weight of the PVB resin can be in the range of from about 50,000 to about 600,000, about 70,000 to about 450,000, or about 100,000 to about 425,000 Daltons.

The PVB resin may be produced by known aqueous or solvent acetalization processes by reacting polyvinyl alcohol ("PVOH") with butyraldehyde in the presence of an acid catalyst, separation, stabilization, and drying of the resin. Such acetalization processes are disclosed, for example, in U.S. Pat. Nos. 2,282,057 and 2,282,026 and Wade, B. (2016), "Vinyl Acetal Polymers", *Encyclopedia of Polymer Science and Technology*, pp. 1-22 (John Wiley & Sons, Inc.), the entire disclosures of which are incorporated herein by reference.

While generally referred herein as "poly(vinyl acetal)" or "poly(vinyl butyral)", the resins described herein may include residues of any suitable aldehyde, including, but not limited to, isobutyraldehyde, as previously discussed. In some embodiments, one or more poly(vinyl acetal) resin can include residues of at least one $C_1$ to $C_{10}$ aldehyde, or at least one $C_4$ to $C_8$ aldehyde. Examples of suitable $C_4$ to $C_8$ aldehydes can include, but are not limited to, n-butyraldehyde, isobutyraldehyde, 2-methylvaleraldehyde, n-hexyl aldehyde, 2-ethylhexyl aldehyde, n-octyl aldehyde, and combinations thereof.

In many embodiments, plasticizers are added to the polymer resin to form polymer layers or interlayers. Plasticizers are generally added to the polymer resin to increase the flexibility and durability of the resultant polymer interlayer. Plasticizers function by embedding themselves between chains of polymers, spacing them apart (increasing the "free volume") and thus significantly lowering the glass transition temperature ($T_g$) of the polymer resin, making the material softer. In this regard, the amount of plasticizer in the interlayer can be adjusted to affect the glass transition temperature ($T_g$). The glass transition temperature ($T_g$) is the temperature that marks the transition from the glassy state of the interlayer to the rubbery state. In general, higher amounts of plasticizer loading can result in lower $T_g$. In some embodiments, such as when the interlayer is an acoustic trilayer, the inner core layer (i.e., the soft layer) will have a glass transition temperature less than about 20 °C, while the outer skin layers (e.g., the stiff layer) will have a glass transition temperature greater than about 25 °C.

Contemplated plasticizers include, but are not limited to, esters of a polybasic acid, a polyhydric alcohol, triethylene glycol di-(2-ethylbutyrate), triethylene glycol di-(2-ethylhexonate) (known as "3-GEH"), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, and polymeric plasticizers such as oil-modified sebacic alkyds and mixtures of phosphates and adipates, and mixtures and combinations thereof. 3-GEH is particularly preferred. Other examples of suitable plasticizers can include, but are not limited to, tetraethylene glycol di-(2-ethylhexanoate) ("4-GEH"), di(butoxyethyl) adipate, and bis(2-(2-butoxyethoxy)ethyl) adipate, dioctyl sebacate, nonylphenyl tetraethylene glycol, and mixtures thereof.

Other suitable plasticizers may include blends of two or more distinct plasticizers, including but not limited to those plasticizers described above. Still other suitable plasticizers, or blends of plasticizers, may be formed from aromatic groups, such polyadipates, epoxides, phthalates, terephthalates, benzoates, toluates, mellitates and other specialty plasticizers. Further examples include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof. In some embodiments, the plasticizer can be selected from the group consisting of dipropylene glycol dibenzoates, tripropylene glycol dibenzoates, and combinations thereof.

Generally, the plasticizer content of the polymer interlayers of this application are measured in parts per hundred resin parts ("phr"), on a weight per weight basis. For example, if 30 grams of plasticizer is added to 100 grams of polymer resin, the plasticizer content of the resulting plasticized polymer would be 30 phr. When the plasticizer content of a polymer layer is given in this application, the plasticizer content of the particular layer is determined in reference to the phr of the plasticizer in the melt that was used to produce that particular layer. In some embodiments, the high rigidity interlayer comprises a layer having a plasticizer content of less than about 35 phr and less than about 30 phr.

According to some embodiments of the present invention, one or more polymer layers described herein can have a total plasticizer content of at least about 20 phr, at least about 25 phr, at least about 30 phr, at least about 35 phr, at least about 38 phr, at least about 40 phr, at least about 45 phr, at least about 50 phr, at least about 55 phr, at least about 60 phr, at least about 65 phr, at least about 67 phr, at least about 70 phr, at least about 75 phr of one or more plasticizers. In some embodiments, the polymer layer may also include not more than about 100 phr, not more than about 85 phr, not more than 80 phr, not more than about 75 phr, not more than about 70 phr, not more than about 65 phr, not more than about 60 phr, not more than about 55 phr, not more than about 50 phr, not more than about 45 phr, not more than about 40 phr, not more than about 38 phr, not more than about 35 phr, or not more than about 30 phr of one or more plasticizers. In some embodiments, the total plasticizer content of at least one polymer layer can be in the range of from about 20 to about 40 phr, about 20 to about 38 phr, or about 25 to about 35 phr. In other embodiments, the total plasticizer content of at least one polymer layer can be in the range of from about 38 to about 90 phr, about 40 to about 85 phr, or about 50 to 70 phr.

When the interlayer includes a multiple layer interlayer, two or more polymer layers within the interlayer may have substantially the same plasticizer content and/or at least one of the polymer layers may have a plasticizer content different from one or more of the other polymer layers. When the interlayer includes two or more polymer layers having different plasticizer contents, the two layers may be adjacent to one another. In some embodiments, the difference in plasticizer content between adjacent polymer layers can be at least about 1, at least about 2, at least about 5, at least about 7, at least about 10, at least about 20, at least about 30, at least about 35 phr and/or not more than about 80, not more than about 55, not more than about 50, or not more than about 45 phr, or in the range of from about 1 to about 60 phr, about 10 to about 50 phr, or about 30 to 45 phr. When three or more layers are present in the interlayer, at least two of the polymer layers of the interlayer may have similar plasticizer contents falling for example, within 10, within 5, within 2, or within 1 phr of each other, while at least two of the polymer layers may have plasticizer contents differing from one another according to the above ranges.

In some embodiments, one or more polymer layers or interlayers described herein may include a blend of two or more plasticizers including, for example, two or more of the plasticizers listed above. When the polymer layer includes two or more plasticizers, the total plasticizer content of the polymer layer and the difference in total plasticizer content between adjacent polymer layers may fall within one or more of the ranges above. When the interlayer is a multiple layer interlayer, one or more than one of the polymer layers may include two or more plasticizers. In some embodiments when the interlayer is a multiple layer interlayer, at least one of the polymer layers including a blend of plasticizers may have a glass transition temperature higher than that of conventional plasticized polymer layer. This may provide, in some cases, additional stiffness to layer which can be used, for example, as an outer "skin" layer in a multiple layer interlayer.

In addition to plasticizers, it is also contemplated that adhesion control agents ("ACAs") can also be added to the polymer resins to form polymer interlayers. ACAs generally function to alter and/or improve the adhesion of the interlayer to the glass panels when forming a laminated panel. Contemplated ACAs include, but are not limited to, magnesium carboxylates/salts. In addition, contemplated ACAs may also include those ACAs disclosed in U.S. Pat. No. 5,728,472, incorporated by reference herein in its entirety, such as residual sodium acetate, potassium acetate, and/or magnesium bis(2-ethyl butyrate).

Other additives may be incorporated into the interlayer to enhance its performance in a final product and impart certain additional properties to the interlayer. Such additives include, but are not limited to, dyes, pigments, stabilizers (e.g., ultraviolet stabilizers), antioxidants, anti-blocking agents, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, UV stabilizers, dispersants, surfactants, chelating agents, coupling agents, adhesives, primers, reinforcement additives, and fillers, among other additives known to those of ordinary skill in the art.

One parameter used to describe the polymer resin components of the polymer interlayers of this application is residual hydroxyl content (as vinyl hydroxyl content or poly(vinyl alcohol) ("PVOH") content). Residual hydroxyl content refers to the amount of hydroxyl groups remaining as side groups on the chains of the polymer after processing is complete. For example, PVB can be manufactured by hydrolyzing poly(vinyl acetate) to poly(vinyl alcohol), and then reacting the poly(vinyl alcohol) with butyraldehyde to form PVB. In the process of hydrolyzing the poly(vinyl acetate), typically not all the acetate side groups are converted to hydroxyl groups. Further, the reaction with butyraldehyde typically will not result in all the hydroxyl groups being converted into acetal groups. Consequently, in any finished PVB, there will typically be residual acetate groups (such as vinyl acetate groups) and residual hydroxyl groups (such as vinyl hydroxyl groups) as side groups on the polymer chain. Generally, the residual hydroxyl content of a polymer can be regulated by controlling the reaction times and reactant concentrations, among other variables in the polymer manufacturing process. When utilized as a parameter herein, the residual hydroxyl content is measured on a wt. % basis per ASTM D-1396.

In various embodiments, the poly(vinyl butyral) resin comprises about 8 to about 35 wt. % (wt. %) residual hydroxyl groups calculated as PVOH, about 13 to about 30 wt. % residual hydroxyl groups calculated as PVOH, about 8 to about 22 wt. % residual hydroxyl groups calculated as PVOH, or about 15 to about 22 wt. % residual hydroxyl groups calculated as PVOH; and for some of the high rigidity interlayers disclosed herein, for one or more of the layers, the poly(vinyl butyral) resin comprises greater than about 19 wt. % residual hydroxyl groups calculated as PVOH, greater than about 20 wt. % residual hydroxyl groups calculated as PVOH, greater than about 20.4 wt. % residual hydroxyl groups calculated as PVOH, and greater than about 21 wt. % residual hydroxyl groups calculated as PVOH.

In some embodiments, the poly(vinyl butyral) resin used in at least one polymer layer of an interlayer may include a poly(vinyl butyral) resin that has a residual hydroxyl content of at least about 18, at least about 18.5, at least about 18.7, at least about 19, at least about 19.5, at least about 20, at least about 20.5, at least about 21, at least about 21.5, at least about 22, at least about 22.5 wt. % and/or not more than about 30, not more than about 29, not more than about 28, not more than about 27, not more than about 26, not more than about 25, not more than about 24, not more than about 23, or not more than about 22 wt. %, measured as described above.

Additionally, one or more other polymer layers in the interlayers described herein may include another poly(vinyl butyral) resin that has a lower residual hydroxyl content. For example, in some embodiments, at least one polymer layer of the interlayer can include a poly(vinyl butyral) resin having a residual hydroxyl content of at least about 8, at least about 8.5, at least about 9, at least about 9.5, at least about 10, at least about 10.5, at least about 11, at least about 11.5, at least about 12, at least about 13 wt. % and/or not more than about 16, not more than about 15, not more than about 14, not more than about 13.5, not more than about 13, not more than about 12, or not more than about 11.5 wt. %, measured as described above.

When the interlayer includes two or more polymer layers, the layers may include poly(vinyl butyral) resins that have substantially the same residual hydroxyl content, or the residual hydroxyl contents of the poly(vinyl butyral) resins in each layer may differ from each other. When two or more layers include poly(vinyl butyral) resins having substantially the same residual hydroxyl content, the difference between the residual hydroxyl contents of the poly(vinyl butyral) resins in each layer may be less than about 2, less than about 1, or less than about 0.5 wt. %. As used herein, the terms "weight percent different" and "the difference between . . . is at least . . . weight percent" refer to a difference between two given weight percentages, calculated by subtracting one number from the other. For example, a poly(vinyl acetal) resin having a residual hydroxyl content of 12 wt. % has a residual hydroxyl content that is 2 wt. % different than a poly(vinyl acetal) resin having a residual hydroxyl content of 14 wt. % (14 wt. %−12 wt. %=2 wt. %). As used herein, the term "different" can refer to a value that is higher than or lower than another value. Unless otherwise specified, all "differences" herein refer to the numerical value of the difference and not to the specific sign of the value due to the order in which the numbers were subtracted. Accordingly, unless noted otherwise, all "differences" herein refer to the absolute value of the difference between two numbers.

When two or more layers include poly(vinyl butyral) resins having different residual hydroxyl contents, the difference between the residual hydroxyl contents of the poly (vinyl butyral) resins can be at least about 2, at least about 3, at least about 4, at least about 5, at least about 6, at least about 7, at least about 8, at least about 9, at least about 10, at least about 12, at least about 15 wt. %, measured as described above.

The resin can also comprise less than 35 wt. % residual ester groups, less than 30 wt. %, less than 25 wt. %, less than 15 wt. %, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, preferably butyraldehyde acetal, but optionally including other acetal groups in a minor amount, for example, a 2-ethyl hexanal group (see, for example, U.S. Pat. No. 5,137,954, the entire disclosure of which is incorporated herein by reference). The residual acetate content of a resin may also be determined according to ASTM D-1396.

In some embodiments, as described above, one or more of the polymer layers of the interlayer may be formed from poly(vinyl acetal) resin. Such poly(vinyl acetal) resin may have a residual acetate content of at least about 1, at least about 3, at least about 5, at least about 7 wt. % and/or not more than about 15, not more than about 12, not more than about 10, not more than about 8 wt. %, measured as described above. When the interlayer comprises a multiple layer interlayer, two or more polymer layers can include resins having substantially the same residual acetate content, or one or more resins in various layers can have substantially different acetate contents. When the residual acetate contents of two or more resins are substantially the same, the difference in the residual acetate contents may be, for example, less than about 3, less than about 2, less than about 1, or less than about 0.5 wt. %. In some embodiments, the difference in residual acetate content between two or more poly(vinyl butyral) resins in a multiple layer interlayer can be at least about 3, at least about 5, at least about 8, at least about 15, at least about 20, or at least about 30 wt. %. When such resins are utilized in a multiple layer interlayer, the resins having different residual acetate contents may be located in adjacent polymer layers. When the multiple layer interlayer is a three-layer interlayer including a pair of outer "skin" layers surrounding, or sandwiching, an inner "core" layer, for example, the core layer may include a resin having higher or lower residual acetate content. At the same time, the resin in the inner core layer can have a residual hydroxyl content that is higher or lower than the residual hydroxyl content of the outer skin layer and fall within one or more of the ranges provided previously.

Poly(vinyl acetal) resins having higher or lower residual hydroxyl contents and/or residual acetate contents may also, when combined with at least one plasticizer, ultimately include different amounts of plasticizer. As a result, layers or domains formed of first and second poly(vinyl acetal) resins having different compositions may also have different properties within a single polymer layer or interlayer. Notably, for a given type of plasticizer, the compatibility of the plasticizer in the polymer is largely determined by the hydroxyl content of the polymer. Polymers with a greater residual hydroxyl content are typically correlated with reduced plasticizer compatibility or capacity. Conversely, polymers with a lower residual hydroxyl content typically will result in increased plasticizer compatibility or capacity. As a result, poly(vinyl acetal) resins with higher residual hydroxyl contents tend to be less plasticized and exhibit higher stiffness than similar resins having lower residual hydroxyl contents. Conversely, poly(vinyl acetal) resins having lower residual hydroxyl contents may tend to, when plasticized with a given plasticizer, incorporate higher amounts of plasticizer, which may result in a softer polymer layer that exhibits a lower glass transition temperature than a similar resin having a higher residual hydroxyl content. Depending on the specific resin and plasticizer, these trends could be reversed.

When two poly(vinyl acetal) resins having different levels of residual hydroxyl content are blended with a plasticizer, the plasticizer may partition between the polymer layers or domains, such that more plasticizer can be present in the layer or domain having the lower residual hydroxyl content and less plasticizer may be present in the layer or domain having the higher residual hydroxyl content. Ultimately, a state of equilibrium is achieved between the two resins. Generally, this correlation between the residual hydroxyl content of a polymer and plasticizer compatibility/capacity can be manipulated and exploited to allow for addition of the proper amount of plasticizer to the polymer resin and to stably maintain differences in plasticizer content within multilayered interlayers. Such a correlation also helps to stably maintain the difference in plasticizer content between two or more resins when the plasticizer would otherwise migrate between the resins.

As a result of the migration of plasticizer within an interlayer, the glass transition temperatures of one or more polymer layers may be different when measured alone or as part of a multiple layer interlayer. In some embodiments, the interlayer can include at least one polymer layer having a glass transition temperature, outside of an interlayer, of at least about 33, at least about 34, at least about 35, at least about 36, at least about 37, at least about 38, at least about 39, at least about 40, at least about 41, at least about 42, at least about 43, at least about 44, at least about 45, or at least about 46 °C. In some embodiments, the same layer may have a glass transition temperature within the polymer layer of at least about 34, at least about 35, at least about 36, at least about 37, at least about 38, at least about 39, at least about 40, at least about 41, at least about 42, at least about 43, at least about 44, at least about 45, at least about 46, or at least about 47 °C.

In the same or other embodiments, at least one other polymer layer of the multiple layer interlayer can have a glass transition temperature less than 30 °C and may, for example, have a glass transition temperature of not more than about 25, not more than about 20, not more than about 15, not more than about 10, not more than about 9, not more than about 8, not more than about 7, not more than about 6, not more than about 5, not more than about 4, not more than about 3, not more than about 2, not more than about 1, not more than about 0, not more than about −1, not more than about −2 °C, or not more than about −5 °C, measured when the interlayer is not part of an interlayer. The same polymer layer may have a glass transition temperature of not more than about 25, not more than about 20, not more than about 15, not more than about 10, not more than about 9, not more than about 8, not more than about 7, not more than about 6, not more than about 5, not more than about 4, not more than about 3, not more than about 2, not more than about 1, or not more than about 0 °C, when measured outside of the interlayer.

According to some embodiments, the difference between the glass transition temperatures of two polymer layers, typically adjacent polymer layers within an interlayer, can be at least about 5, at least about 10, at least about 15, at least about 20, at least about 25, at least about 30, at least about 35, at least about 40, or at least about 45 °C, while in other embodiments, two or more polymer layers can have a glass transition temperature within about 5, about 3, about 2, or about 1 °C of each other. Generally, the lower glass transition temperature layer has a lower stiffness than the higher glass transition temperature layer or layers in an interlayer and may be located between higher glass transition temperature polymer layers in the final interlayer construction.

For example, in some embodiments of this application, the increased acoustic attenuation properties of soft layers are combined with the mechanical strength of stiff/rigid layers to create a multilayered interlayer. In these embodiments, a central soft layer is sandwiched between two stiff/rigid outer layers. This configuration of (stiff)//(soft)//(stiff) creates a multilayered interlayer that is easily handled, can be used in conventional lamination methods and that can be constructed with layers that are relatively thin and light. The soft layer is generally characterized by a lower residual hydroxyl content (e.g., less than or equal to 16 wt. %, less than or equal to 15 wt. %, or less than or equal to 12 wt. % or any of the ranges disclosed above), a higher plasticizer content (e.g., greater than or equal to about 48 phr or greater than or equal to about 70 phr, or any of the ranges disclosed above) and/or a lower glass transition temperature (e.g., less than 30 °C or less than 10 °C, or any of the ranges disclosed above).

It is contemplated that polymer interlayer sheets as described herein may be produced by any suitable process known to one of ordinary skill in the art of producing polymer interlayer sheets that are capable of being used in a multiple layer panel (such as a glass laminate). For example, it is contemplated that the polymer interlayer sheets may be formed through solution casting, compression molding, injection molding, melt extrusion, melt blowing or any other procedures for the production and manufacturing of a polymer interlayer sheet known to those of ordinary skill in the art. Further, in embodiments where multiple polymer interlayers are utilized, it is contemplated that these multiple polymer interlayers may be formed through co-extrusion, blown film, dip coating, solution coating, blade, paddle, air-knife, printing, powder coating, spray coating or other processes known to those of ordinary skill in the art. While all methods for the production of polymer interlayer sheets known to one of ordinary skill in the art are contemplated as possible methods for producing the polymer interlayer sheets described herein, this application will focus on polymer interlayer sheets produced through extrusion and/or co-extrusion processes. The final multiple layer glass panel laminate of the present disclosure are formed using processes known in the art.

In the extrusion process, thermoplastic resin and plasticizers, including any of those resins and plasticizers described above, are generally pre-mixed and fed into an extruder device. Additives such as colorants and UV inhibitors (in liquid, powder, or pellet form) may be used and can be mixed into the thermoplastic resin or plasticizer prior to arriving in the extruder device. These additives are incorporated into the thermoplastic polymer resin, and by extension the resultant polymer interlayer sheet, to enhance certain properties of the polymer interlayer sheet and its performance in the final multiple layer glass panel product.

In the extruder device, the particles of the thermoplastic raw material and plasticizers, including any of those resins, plasticizers, and other additives described above, are further mixed and melted, resulting in a melt that is generally uniform in temperature and composition. Embodiments of the present invention may provide for the melt temperature to be approximately 200 °C. Once the melt reaches the end of the extruder device, the melt is propelled into the extruder die. The extruder die is the component of the extruder device which gives the final polymer interlayer sheet product its profile. The die will generally have an opening, defined by a lip, that is substantially greater in one dimension than in a perpendicular dimension. Generally, the die is designed such that the melt evenly flows from a cylindrical profile coming out of the die and into the product's end profile shape. A plurality of shapes can be imparted to the end polymer interlayer sheet by the die so long as a continuous profile is present. Generally, in its most basic sense, extrusion is a process used to create objects of a fixed cross-sectional profile. This is accomplished by pushing or drawing a material through a die of the desired cross-section for the end product.

In some embodiments, a co-extrusion process may be utilized. Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. For example, the multiple layer interlayers of the present invention (e.g., in the form of a trilayer interlayer) may be preferably co-extruded using a multiple manifold co-extrusion device which includes a first die manifold, a second die manifold, and a third die manifold. The co-extrusion device may operate by simultaneously extruding polymer melts from each manifold through a die and out of an opening, where the multiple layer interlayer is extruded as a composite of three individual polymer layers. The polymer melts may flow through the die such that the core layer is positioned between the skin layers, to result in the manufacture of a trilayer interlayer with the core layer sandwiched between the skin layers. The die opening may include a pair of lips positioned on either side of the opening. Given the positional orientation of the polymer melts, the skin layers may come into contact with the lips. Regardless, the interlayer thickness can be varied by adjusting the distance between die lips located at the die opening.

The thickness of the multiple polymer layers leaving the extrusion die in the co-extrusion process can generally be controlled by adjustment of the relative speeds of the melt through the extrusion die and by the sizes of the individual die lips. According to some embodiments, the total thickness of the multiple layer interlayer can be at least about 13 mils, at least about 20, at least about 25, at least about 27, at least about 30, at least about 31 mils and/or not more than about 75, not more than about 70, not more than about 65, not more than about 60 mils, or it can be in the range of from about 13 to about 75 mils, about 25 to about 70 mils, or about 30 to 60 mils. When the interlayer comprises two or more polymer layers, each of the layers can have a thickness of at least about 2, at least about 3, at least about 4, at least about 5, at least about 6, at least about 7, at least about 8, at least about 9, at least about 10 mils and/or not more than about 50, not more than about 40, not more than about 30, not more than about 20, not more than about 17, not more than about 15, not more than about 13, not more than about 12, not more than about 10, not more than about 9 mils. In some embodiments, each of the layers may have approximately the same thickness, while in other embodiments, one or more layers may have a different thickness than one or more other layers within the interlayer.

In some embodiments wherein the interlayer comprises at least three polymer layers, one or more of the inner layers can be relatively thin, as compared to the other outer layers. For example, in some embodiments wherein the multiple layer interlayer is a three-layer interlayer, the innermost layer can have a thickness of not more than about 12, not more than about 10, not more than about 9, not more than about 8, not more than about 7, not more than about 6, not more than about 5 mils, or it may have a thickness in the range of from about 2 to about 12 mils, about 3 to about 10 mils, or about 4 to about 9 mils. In the same or other embodiments, the thickness of each of the outer layers can be at least about 4, at least about 5, at least about 6, at least about 7 mils and/or not more than about 15, not more than about 13, not more than about 12, not more than about 10, not more than about 9, not more than about 8 mils, or can be in the range of from about 2 to about 15, about 3 to about 13, or about 4 to about 10 mils. When the interlayer includes two outer layers, these layers can have a combined thickness of at least about 9, at least about 13, at least about 15, at least about 16, at least about 18, at least about 20, at least about 23, at least about 25, at least about 26, at least about 28, or at least about 30 mils, and/or not more than about 73, not more than about 60, not more than about 50, not more than about 45, not more than about 40, not more than about 35 mils, or in the range of from about 9 to about 70 mils, about 13 to about 40 mils, or about 25 to about 35 mils.

According to some embodiments, the ratio of the thickness of one of the outer layers to one of the inner layers in a multiple layer interlayer can be at least about 1.4:1, at least about 1.5:1, at least about 1.8:1, at least about 2:1, at least about 2.5:1, at least about 2.75:1, at least about 3:1, at least about 3.25:1, at least about 3.5:1, at least about 3.75:1, or at least about 4:1. When the interlayer is a three-layer interlayer having an inner core layer disposed between a pair of outer skin layers, the ratio of the thickness of one of the skin layers to the thickness of the core layer may fall within one or more of the ranges above. In some embodiments, the ratio of the combined thickness of the outer layers to the inner layer can be at least about 2.25:1, at least about 2.4:1, at least about 2.5:1, at least about 2.8:1, at least about 3:1, at least about 3.5:1, at least about 4:1, at least about 4.5:1, at least about 5:1, at least about 5.5:1, at least about 6:1, at least about 6.5:1, or at least about 7:1 and/or not more than about 30:1, not more than about 20:1, not more than about 15:1, not more than about 10:1, not more than about 9:1, or not more than about 8:1.

Multiple layer interlayers as described herein can comprise generally flat interlayers having substantially the same thickness along the length, or longest dimension, and/or width, or second longest dimension, of the sheet. In some embodiments, however, the multiple layer interlayers of the present invention can be tapered, or wedge-shaped, interlayers that comprise at least one tapered zone having a wedge-shaped profile. Tapered interlayers have a changing thickness profile along at least a portion of the length and/or width of the sheet, such that, for example, at least one edge of the interlayer has a thickness greater than the other. When the interlayer is a tapered interlayer, at least 1, at least 2, at least 3, or more of the individual resin layers may include at least one tapered zone. Tapered interlayers may be particularly useful in, for example, heads-up display (HUD) panels in automotive and aircraft applications.

In view of the above, embodiments of the present invention include a polymer interlayer that resists formation of optical defects. The polymer interlayer may comprise a core layer, a first skin layer, and a second skin layer. The core layer will generally be positioned between the first and second skin layers, such that the skin layers sandwich the core layer. Notably, the core layer comprises a resin including an adhesion control agent in the range of about 0.1 to 15 titers.

Beneficially, in such embodiments, the polymer interlayer will have a lower bubble formation than prior art polymer interlayers. For example, the polymer interlayer may have no more than two bubbles, no more than one bubble, and/or no bubbles formed throughout the polymer interlayer. In some specific embodiments, the polymer interlayer may have no more than two edge bubbles, no more than one edge bubble, and/or no edge bubbles formed throughout the polymer interlayer (e.g., when laminated between a pair of glass sheets to form a laminated glass panel). In particular, when the inventive polymer interlayer is laminated between a pair of glass sheets to form a laminated glass panel, such glass panel may have no bubbles formed in the glass panel. In some embodiments, the glass panel may have no more than two bubbles or no more than one bubble. In some specific embodiments, the laminated glass panel may have no more than two edge bubbles, no more than one edge bubble, and/or no edge bubbles. The determination of the presence of edge bubbles will be described in more detail below in Example 1.

To facilitate such reduction in bubbles within the interlayer and/or the laminated panel, the core layer of the interlayer may include an adhesion control agent in the range of about 0.1 to 15 titers 0.1 to 13 titers, 0.1 to 12 titers, 0.1 to 11 titers, 0.1 to 10 titers, 0.1 to 9 titers, 0.1 to 8 titers, 0.1 to 6 titers, 0.1 to 5 titers, 0.5 to 18 titers, 0.5 to 15 titers, 0.5 to 13 titers, 0.5 to 12 titers, 0.5 to 11 titers, 0.5 to 10 titers, 0.5 to 9 titers, 0.5 to 8 titers, 0.5 to 6 titers, 0.5 to 5 titers, 5 to 18 titers, 5 to 15 titers, 5 to 13 titers, 5 to 12 titers, 5 to 11 titers, 5 to 10 titers, 5 to 9 titers, 5 to 8 titers, 5 to 6 titers, 8 to 18 titers, 8 to 15 titers, 8 to 13 titers, 8 to 12 titers, 8 to 11 titers, 8 to 10 titers, 8 to 9 titers, 10 to 18 titers, 10 to 15 titers, 10 to 13 titers, 10 to 12 titers, 10 to 11 titers, 12 to 18 titers, 12 to 15 titers, 12 to 13 titers, 13 to 18 titers, and/or 13 to 15 titers. In certain embodiments, the adhesion control agent in the first polymer layer comprises magnesium salt. As used herein, one titer of ACA is defined to mean $1\times10^{-7}$ mole of adhesion control agent (ACA) (e.g., magnesium salt) per gram of resin.

The above-described polymer interlayer, which resists formation of optical defects (e.g., bubbles) may be formed by extruding a first polymer melt to form the core layer and extruding a second polymer melt to form the first and second skin layers. In some embodiments, the first polymer melt will be fed by a first extruder (e.g., a core extruder), while the second polymer melts will be fed by a second extruder (e.g., a skin extruder) and then split into two streams to form the skin layers. Regardless the core layer and the skin layers will generally be co-extruded, such that the core layer is positioned between the first and second skin layers. Notably, the first polymer melt, from which the core layer is formed, comprises a resin that includes an adhesion control agent in the range of about 0.1 to 15 titers.

As such, the polymer interlayer will have a lower bubble formation than prior art polymer interlayers. For example, the polymer interlayer may have no more than two bubbles, no more than one bubble, and/or no bubbles formed throughout the polymer interlayer. In some specific embodiments, the polymer interlayer may have no more than two edge bubbles, no more than one edge bubble, and/or no edge bubbles formed throughout the polymer interlayer (e.g., when the interlayer is laminated between a pair of glass sheets to form a laminated glass panel).

Furthermore, embodiments may additionally include a method of forming a laminated glass panel with reduced optical defects. Such method may include laminating the above-described polymer interlayer between a pair of glass sheets to form a laminated glass panel. Such glass panel may, in certain embodiments, have no bubbles (e.g., edge bubbles or trim bubbles) formed in the glass panel. In some embodiments, the glass panel may have no more than two bubbles (e.g., edge bubbles or trim bubbles) or no more than one bubble (e.g., edge bubbles or trim bubbles) formed in the glass panel. In some specific embodiments, the laminated glass panel may have no more than two edge bubbles, no more than one edge bubble, and/or no edge bubbles.

EXAMPLES

Example 1

Four sets of laminated glass panels were formed, as described in more detail below. Each of the glass panels included a polymer interlayer sandwiched between a pair of glass sheets, and each polymer interlayer comprised a core layer sandwiched between a pair of skin layers. Each set included eight glass panels with a particular amount of adhesion control agent (ACA) included in the applicable core layers. In particular, a first set of eight laminated glass panels was formed with twenty-six titers of ACA in the core layers. A second set of eight laminated glass panels was formed with twenty-two titers of ACA in the core layers. A third set of eight laminated glass panels was formed with eighteen titers of ACA in the core layers. A fourth set of eight laminated glass panels was formed with twelve titers of ACA in the core layers. One titer is equivalent to about 1.37 ppm of magnesium salt. As illustrated in Table 1 below, the number of bubbles identified in each of the glass panels was counted.

In more detail, each of the polymer interlayers were formed with PVB via co-extrusion. The amount of ACA included in the core layers was as discussed in the above paragraph. Upon formation of the polymer interlayers, the interlayers were conditioned at 40 °C and 25% relative humidity (RH) for four hours. Thereafter, the polymer interlayers were laminated between pairs of glass sheets, such that each resulting laminated glass panel was generally square measuring 15 cm by 15 cm. The laminated glass panels were then autoclaved according to the following conditions. First, the laminated glass panels were inserted into the autoclave, which was at an atmospheric pressure and a temperature of approximately 20 °C. Over approximately one minute, the pressure inside the autoclave was increased to 13 bar for the remainder of the autoclave process. Upon reaching the autoclaving pressure, the temperature was increased to 143 °C at a rate of 6 °C/minute. The temperature was held at 143 °C for twenty minutes, at which time the pressure was decreased at a rate of 4.5 °C/minute until reaching an ending temperature of 45 °C. At such time, the pressure was reduced back to atmospheric pressure, and the autoclaving process ended. The laminated glass panels were allowed to cool for one hour at room temperature and were then placed in an oven at 100 °C for sixteen hours.

Thereafter, bubbles were counted for each of the laminated glass panels. Specifically, an edge bubble test was used to count the number of edge bubbles present at each of the four edges of the glass panels. According to the test, the number of edge bubbles were visually counted for each laminated glass panel. Edge bubbles are bubbles formed within the glass panels, adjacent the edges of the glass panels. Specifically, as used herein, edge bubbles are bubbles that form within the glass panels and/or the polymer interlayers, within about 5 mm from the edges of the glass panels and/or polymer interlayers. Edge bubbles are usually circular, having a diameter from a few tenths of a millimeter to about 1 millimeter. The results of the edge bubble test are reproduced below in Table 1, which shows the number of edge bubbles counted for each glass panel.

TABLE 1

| | | | | | | | | | | | | | | | | |
|---|---|---|---|---|---|---|---|---|---|---|---|---|---|---|---|---|
| Core ACA (Titers) | 26 | 26 | 26 | 26 | 26 | 26 | 26 | 26 | 22 | 22 | 22 | 22 | 22 | 22 | 22 | 22 |
| Core ACA Mg (ppm) | 36 | 36 | 36 | 36 | 36 | 36 | 36 | 36 | 30 | 30 | 30 | 30 | 30 | 30 | 30 | 30 |
| Bubbles (Count) | 4 | 5 | 4 | 2 | 2 | 2 | 3 | 2 | 2 | 2 | 1 | 0 | 0 | 30 | 1 | 3 |
| Core ACA (Titers) | 18 | 18 | 18 | 18 | 18 | 18 | 18 | 18 | 12 | 12 | 12 | 12 | 12 | 12 | 12 | 12 |

TABLE 1-continued

| | | | | | | | | | | | | | | | | |
|---|---|---|---|---|---|---|---|---|---|---|---|---|---|---|---|---|
| Core ACA Mg (ppm) | 25 | 25 | 25 | 25 | 25 | 25 | 25 | 25 | 16 | 16 | 16 | 16 | 16 | 16 | 16 | 16 |
| Bubbles (Count) | 1 | 2 | 0 | 2 | 1 | 0 | 1 | 1 | 0 | 1 | 1 | 2 | 0 | 0 | 2 | 0 |

Figure 3:
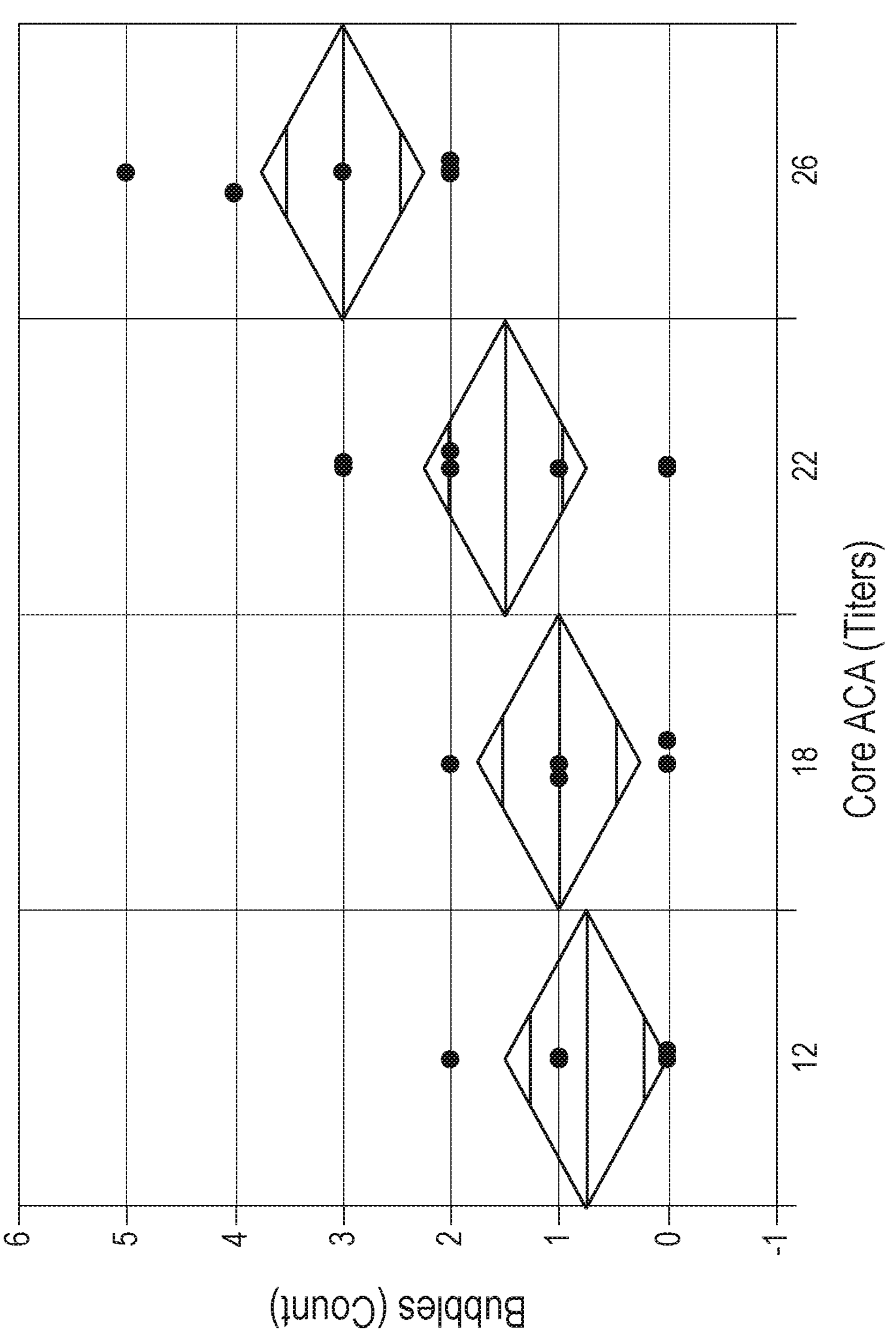
FIG. 3 is a chart illustrating a number of bubbles found in laminated glass panels comprising polymer interlayers, with the number of bubbles determined based on an amount of adhesion control agent (ACA) included in core layers of the polymer interlayers.

As illustrated by the data from Table 1, the number of bubbles identified in the glass panels was found to be generally proportional to the amount of ACA included in the core layers of the polymer interlayers. More generally, lower levels of ACA were found to correspond with fewer or no edge bubbles. For example, the first set of laminated glass panels (each having an ACA amount of 26 titers within its associated core layer) was found to have an average of 3.0 edge bubbles per glass panel. The second set of laminated glass panels (each having an ACA amount of 22 titers within its associated core layer) was found to have an average of 1.5 edge bubbles per glass panel. The third set of laminated glass panels (each having an ACA amount of 18 titers within its associated core layer) was found to have an average of 1.0 edge bubbles per glass panel. Finally, the fourth set of laminated glass panels (each having an ACA amount of 12 titers within its associated core layer) was found to have an average of 0.75 edge bubbles per glass panel. FIG. 3 illustrates the data from Table 1 in chart form. The diamond associated with each data set is used to illustrate the average number of edge bubbles (i.e., via the central line extending across the middle of the diamond) and the 95% confidence interval (i.e., via the upper and lower lines extending across the upper and lower portions of the diamond) for the particular set of laminated glass panels.

It is noted that it was unexpected to find such a proportionality of ACA amount in the interlayer core layer to the number of identified bubbles in the interlayer and/or the laminated glass panel. This is because, as was described previously, ACA is commonly preferred for use in laminated panels to facilitate adhesion between the layer of the laminated panels. Thus, reducing ACA in the interlayer was previously thought to be undesirable. However, it has been found that the interlayers and/or glass panels formed according to embodiments of the present invention maintain required adhesion properties while, unexpectedly, having reduced bubbles.

Example 2

Figure 4:
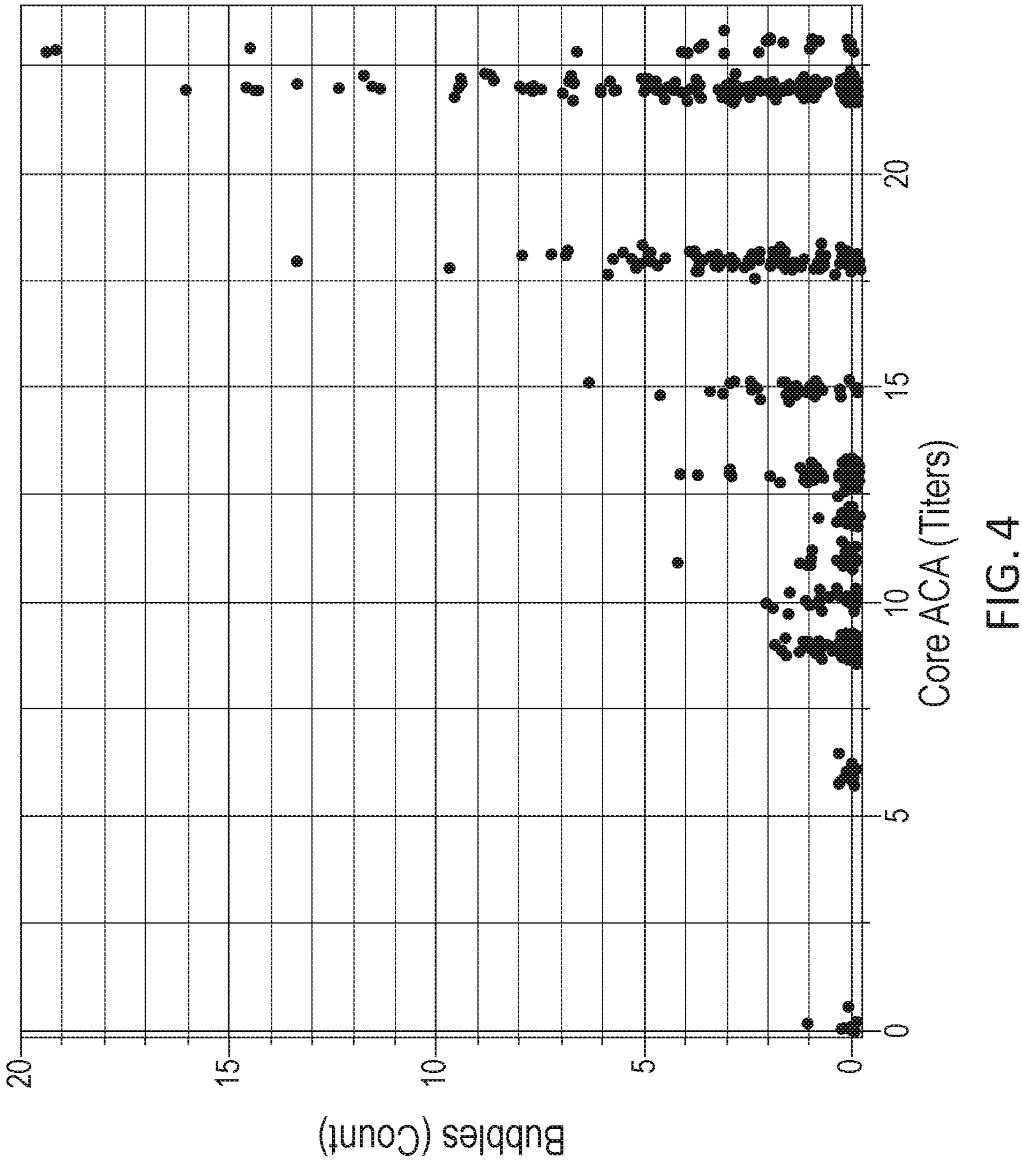
FIG. 4 is another chart illustrating a number of bubbles found in polymer interlayers, with the number of bubbles determined based on an amount of adhesion control agent (ACA) included in core layers of the polymer interlayers.

A plurality of polymer interlayers were formed according to embodiments of the present invention. Each polymer interlayer was formed as a trilayer comprising a core layer sandwiched between a pair of skin layers. The polymer interlayers had varying amounts of adhesion control agent (ACA) included in their respective core layers, as illustrated by the graph of FIG. 4 (it is noted that in FIG. 4, some points have been uniformly shifted to the left or right to show the individual data points for the eleven ACA levels discussed below). In more detail, eleven groups of polymer interlayers were formed, with each respective group having 0.1, 6.0, 9.0, 10.0, 11.0, 12.0, 13.0, 15.0, 18.0, 22.0, and 23.0 titers of ACA in respective core layers of the polymer interlayers from the group. Each of the polymer interlayers was exposed to high pressure and heat, after which a number of bubbles formed in the polymer interlayer was determined. The average number and standard deviation of bubbles for each group of polymer interlayers (based on ACA level) are provided below in Table 2.

TABLE 2

| | | | | | | | | | | | |
|---|---|---|---|---|---|---|---|---|---|---|---|
| Core ACA (Titers) | 0.1 | 6.0 | 9.0 | 10.0 | 11.0 | 12.0 | 13.0 | 15.0 | 18.0 | 22.0 | 23.0 |
| Core ACA Mg (ppm) | 0.1 | 8.2 | 12.3 | 13.7 | 15.1 | 16.4 | 17.8 | 20.6 | 24.7 | 30.1 | 31.5 |
| Bubble Count (Average) | 0.1 | 0.0 | 0.1 | 0.5 | 0.3 | 0.0 | 0.2 | 1.6 | 2.2 | 3.0 | 3.8 |
| Bubble Count (Standard Deviation) | 0.3 | 0.0 | 0.3 | 0.6 | 0.8 | 0.2 | 0.7 | 1.3 | 2.3 | 3.4 | 5.5 |

As illustrated by the data from Table 2 and FIG. 4, the number of bubbles determined in the polymer interlayers of the present example was found to be generally proportional to the amount of ACA included in the core layers of the polymer interlayers. More generally, lower levels of ACA were found to correspond with fewer bubbles.

Furthermore, the individual groups of polymer interlayers from the present example were assigned to qualitative categories, with such categories having been developed by the inventors of the present application. In particular, groups of polymer interlayers with an average bubble count of equal to or greater than 3.0 were deemed to be of "unacceptable" quality because such a high number of bubbles resulted in the polymer interlayers having significant optical defects. Groups of polymer interlayers with an average bubble count of less than 3.0 were deemed to be of "acceptable" quality because such a number of bubbles resulted in the polymer interlayers having acceptable or tolerable optical defects. Furthermore, groups of polymer interlayers with an average bubble count of less than 2.0 were deemed to be of "excellent" quality.

In view of the above, and Table 2 and FIG. 4, it is noted that the groups of polymer interlayers that contained 22.0 and 23.0 titers of ACA both had an unacceptable number of bubbles, on average. In contrast, the groups of polymer interlayers that contained 0.1, 6.0, 9.0, 10.0, 11.0, 12.0, 13.0, and 15.0 titers of ACA each had an acceptable number of bubbles, on average. Furthermore, the groups of polymer interlayers that included 0.1, 6.0, 9.0, 10.0, 11.0, 12.0, 13.0, and 15.0 titers of ACA were each identified as being of excellent quality.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, a polymer layer can be formed comprising plasticizer content in any of the ranges given in addition to any of the ranges given for residual hydroxyl content, where appropriate, to form many permutations that are within the scope of the present invention but that would be cumbersome to list.

What is claimed is:

1. A polymer interlayer that resists formation of optical defects, the polymer interlayer comprising: a first polymer layer; a second polymer layer; and a third polymer layer, wherein said first polymer layer is positioned between said second polymer layer and said third polymer layer, wherein said first polymer layer is softer than said second and third polymer layers, wherein said first polymer layer comprises a resin including an adhesion control agent in the range of about 0.1 to 15 titers.

2. The polymer interlayer of claim 1, wherein the resin of the first polymer layer comprises PVB.

3. The polymer interlayer of claim 1, wherein the adhesion control agent in the first polymer layer comprises magnesium salt.

4. The polymer interlayer of claim 1, wherein the adhesion control in the first polymer layer is in the range of about 0.1 to 13 titers.

5. The polymer interlayer of claim 1, wherein when said polymer interlayer is laminated between a pair of glass sheets to form a laminated glass panel, such glass panel includes no more than two edge bubbles, no more than one edge bubble, and/or no edge bubbles, as determined using an edge bubble test.

6. The polymer interlayer of claim 1, wherein a thickness of said polymer interlayer is generally constant along a length of said polymer interlayer.

7. The polymer interlayer of claim 1, wherein a thickness of said polymer interlayer varies along a length of said polymer interlayer, such that said polymer interlayer has a wedge shape.

8. The polymer interlayer of claim 1, wherein the adhesion control in the first polymer layer is in the range of 0.1 to 12 titers.

9. The polymer interlayer of claim 1, wherein the adhesion control in the first polymer layer is in the range of 0.1 to 10 titers.

10. The polymer interlayer of claim 1, wherein the adhesion control in the first polymer layer is in the range of 0.1 to 9 titers.

11. The polymer interlayer of claim 1, wherein the adhesion control in the first polymer layer is in the range of 0.5 to 13 titers.

12. The polymer interlayer of claim 1, wherein the adhesion control in the first polymer layer is in the range of 5 to 15 titers.

13. The polymer interlayer of claim 1, wherein the adhesion control in the first polymer layer is in the range of 10 to 12 titers.

* * * * *